United States Patent
Patil et al.

(10) Patent No.: US 11,500,893 B2
(45) Date of Patent: Nov. 15, 2022

(54) SYSTEM AND METHOD FOR DYNAMICALLY FINDING DATABASE NODES AND REPLICATION STATE

(71) Applicant: salesforce.com, inc., San Francisco, CA (US)

(72) Inventors: Kamlakar Patil, San Francisco, CA (US); Brett Procek, San Francisco, CA (US); Shivakarthik Subramanyam, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/159,690

(22) Filed: Jan. 27, 2021

(65) Prior Publication Data

US 2022/0237201 A1 Jul. 28, 2022

(51) Int. Cl.
*G06F 16/25* (2019.01)
*G06F 16/27* (2019.01)
*G06F 21/62* (2013.01)
*H04L 67/63* (2022.01)

(52) U.S. Cl.
CPC .......... *G06F 16/252* (2019.01); *G06F 16/256* (2019.01); *G06F 16/27* (2019.01); *G06F 21/6227* (2013.01); *H04L 67/63* (2022.05)

(58) Field of Classification Search
CPC ...... G06F 16/252; G06F 16/27; G06F 16/256; G06F 21/6227; H04L 67/63
USPC ............................................. 707/827
See application file for complete search history.

(56) References Cited

U.S. PATENT DOCUMENTS

| | | | | | |
|---|---|---|---|---|---|
| 6,014,669 | A | * | 1/2000 | Slaughter | G06F 16/275 707/610 |
| 8,412,810 | B1 | * | 4/2013 | Tompkins | G06F 9/5072 709/223 |
| 10,454,754 | B1 | * | 10/2019 | Patel | H04L 69/40 |
| 2010/0005124 | A1 | * | 1/2010 | Wagner | G06F 16/27 707/E17.005 |
| 2011/0071981 | A1 | * | 3/2011 | Ghosh | G06F 16/27 707/634 |
| 2018/0300205 | A1 | * | 10/2018 | Sehgal | G06F 11/1453 |
| 2021/0034586 | A1 | * | 2/2021 | Arye | G06F 16/215 |

* cited by examiner

*Primary Examiner* — Joshua Bullock
(74) *Attorney, Agent, or Firm* — Butzel Long

(57) ABSTRACT

Methods, computer readable media, and devices for dynamically finding database nodes and replication state within a database cluster deployed within a cloud environment are provided. A method may include receiving a database cluster request from a client, retrieving a set of database cluster metadata, establishing a connection with at least one database node of a database cluster via which a status of the database node may be requested and received, and sending the set of database cluster metadata and the status of the database node to the client. In various implementations, the database cluster request may include an identifier for the database cluster, the database cluster may include a plurality of database nodes, and the database cluster may be deployed within a cloud environment.

19 Claims, 4 Drawing Sheets

SYSTEM AND METHOD FOR DYNAMICALLY FINDING DATABASE NODES AND REPLICATION STATE

TECHNICAL FIELD

One or more implementations relate to the field of databases; and more specifically, to identifying a status of database nodes within a database cluster.

BACKGROUND

In a distributed system where application and data may reside on different physical or virtual hosts, an application may need to know a current replication state of a database node the application intends to connect to and perform data manipulation operations. A database system may generally be deployed in a redundant fashion with multiple replication hosts, but only one of the multiple replication hosts may serve as a primary host providing consistent data to the applications. As such, a client application may need to determine which of the multiple replication hosts is the primary host at the time the application establishes a connection.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1A:
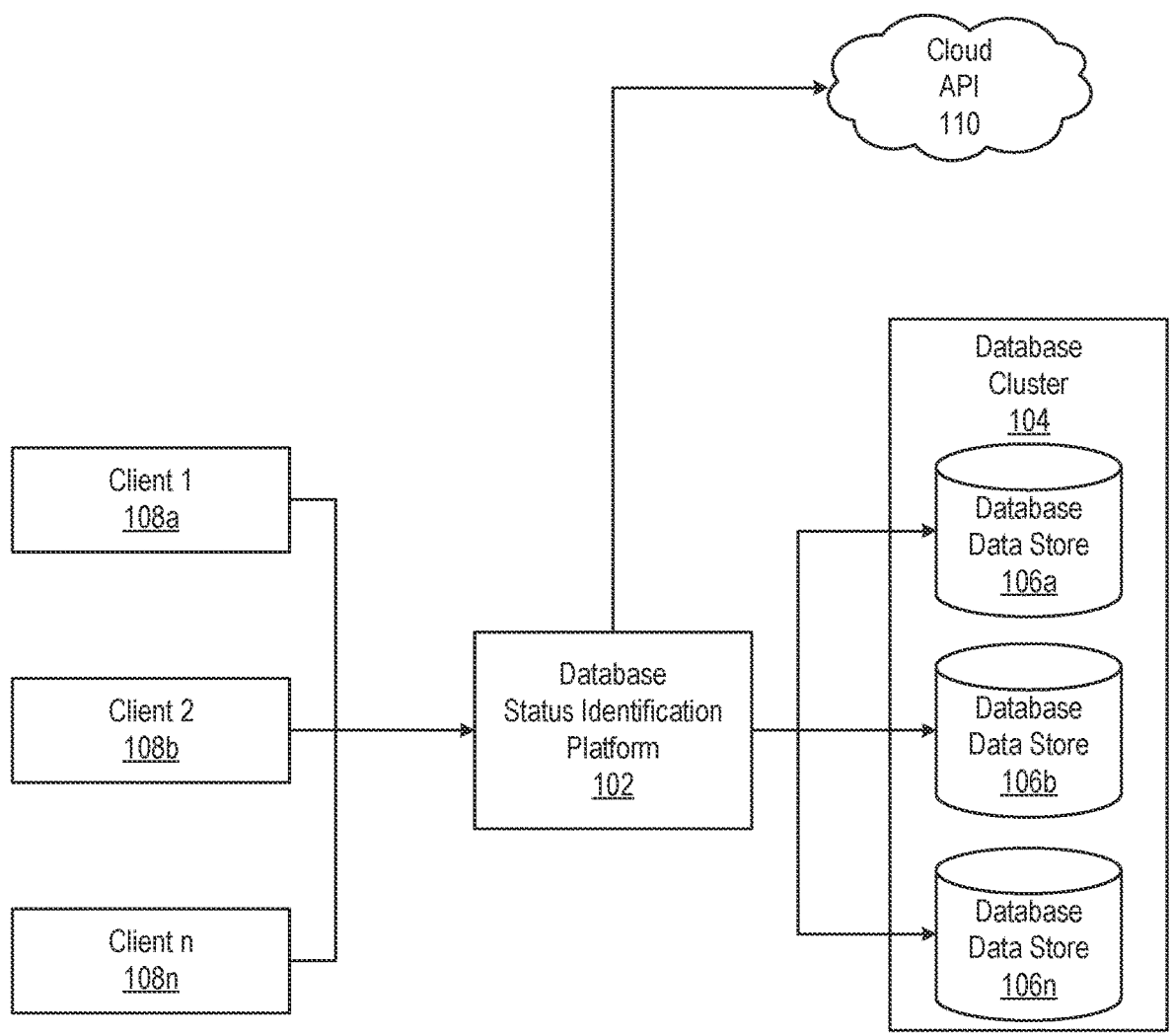
FIG. 1A is a block diagram illustrating a system for dynamically finding database nodes and replication state according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

In various implementations, a database cluster may include a plurality of database nodes. At any given time, a single database node, for example, may be the primary database node with which a client should connect. Over time however, the primary database node may change, for example, due to errors, failures, maintenance, or the like. When a client attempts to connect to the database cluster, the client needs to determine which database node within the database cluster is the primary database node or otherwise the database node with which to connect.

Various implementations of the disclosed subject matter provide for dynamically finding database nodes and replication state within a database cluster deployed within a cloud environment. In various implementations, a highly available system may discover database nodes dynamically without maintaining any state (i.e., without maintaining a registry) and may also provide a current role (i.e., replication state) of each database node within a database cluster.

For example, when a client attempts to connect to a database cluster, a database status identification platform may receive a request from the client. The database status identification platform may, for example, query the cloud environment in which the database cluster is deployed for a set of metadata related to the database cluster. The query may be, for example, via an application programming interface (API) of the cloud environment. In some implementations, the metadata may include information such as a number of database nodes within the database cluster, a network address and port number for each database node, a unique database name, or the like. Based on the metadata, the database status identification platform may, for example, establish a connection with each of the database nodes within the database cluster and retrieve a status of each database node. The database status identification platform may then provide, for example, the metadata and the statuses of the database nodes to the client. Using the metadata and database node statuses, the client may identify an appropriate database node and establish a connection with the appropriate database node.

Various implementations may provide a realtime replication state on demand by fetching such state from each target database host when an application requests such information. Implementations may provide such state information without maintaining any state or registry of the database hosts. Implementations may utilize metadata configured as part of deployment of the database nodes within a cloud environment. For example, a secure endpoint may be provided to an application that needs to know about database node status at runtime. The metadata may be retrieved, for example, based on a unique identifier of the database cluster.

Implementations of the disclosed subject matter provide methods, computer readable media, and devices for dynamically finding database nodes and replication state within a database cluster deployed within a cloud environment. In various implementations, a method may include receiving, by a server, a database cluster request from a client that may include an identifier for a database cluster that may include a plurality of database nodes and may be deployed within a cloud environment and retrieving a set of database cluster metadata via an application programming interface of the cloud environment that may include information about the plurality of database nodes. The method may further include, for at least one of the plurality of database nodes, establishing, by the server, a connection with a respective database node and, via the established connection, requesting and receiving a status of the database node. The method may further include sending the set of database cluster metadata and the status of the database node to the client.

In some implementations, the method may also include determining, by the client, a primary database node of the database cluster based on the set of database cluster metadata and the status of the database node and establishing, by the client, a connection with the primary database node.

In some implementations, the method may further include authenticating the client and validating the database cluster request.

In some implementations, information about the plurality of database nodes may include a number of the plurality of database nodes, a network address and port number for each of the plurality of database nodes, and a database unique name.

In some implementations, establishing a connection with the database node may include establishing a Java database connectivity (JDBC) connection with the database node.

In some implementations, the status of the database node may include a replication state of the database node.

In some implementations, sending the set of database cluster metadata and the status of the database node to the client may include creating a serialized data format payload file, adding the set of database cluster metadata and the status of the database node into the serialized data format payload file, and sending the serialized data format payload file to the client. In some implementations, the serialized data format may be javascript object notation (JSON).

FIG. 1A illustrates a system 100 within which dynamically finding data nodes and replication state within a database cluster deployed within a cloud environment may be utilized. In various implementations, system 100 may include a database status identification platform 102, database cluster 104, database data stores 106a . . . n, clients 108a . . . n, and cloud API 110. Database status identification platform 102 may be, for example, an application or other software environment operating on a server or distributed computing environment.

In various implementations, each database data store 106a . . . n may be a database node deployed on physical computing hardware or within a virtual computing environment. For example, database data store 106a may be deployed on one hardware server, database data store 106b may be deployed on another hardware server, and database data store 106n may be deployed on an n$^{th}$ hardware server. In another example, database data store 106a may be deployed in one virtual environment, database data store 106b may be deployed in another virtual environment, and database data store 106n may be deployed in an n$^{th}$ virtual environment. In this other example, the various virtual environments may all be located on a single physical host, may be deployed on various physical hosts, or may be deployed such that some virtual environments share a single physical host and others are each deployed on a separate dedicated hardware server (i.e., one environment on one hardware server). In yet another example, some number of database nodes may be deployed within virtual environments and other database nodes may be deployed on physical hardware (e.g., database data stores 106a, 106b may be virtual and database data store 106n may be a physical host).

In various implementations, a plurality of database nodes, such as database data stores 106a . . . n, may be collected or otherwise organized within a database cluster, such as database cluster 104. The database cluster may be assigned or otherwise configured with a unique database cluster identifier. The unique database cluster identifier may be, for example, an alphanumeric identifier. In various implementations, database cluster 104 may be deployed within a distributed cloud environment and such cloud environment may provide management via an application programming interface (API), such as cloud API 110. That is, cloud API 110 may be provided, for example, in order to obtain information about database cluster 104 and/or otherwise manage the deployment of database cluster 104 within the cloud environment.

In various implementations, clients 1 . . . n 108a . . . n may be applications and/or components configured to connect with and otherwise interact with database cluster 104. For example, client 1 108a may represent an application and client 2 108b may represent the same application. In another example, client 1 108a may represent one application and client 2 108b may represent another application. In yet another example, each client may represent different components of a single application (e.g., client 1 108a may be component 1, client 2 108b, may be component 2, etc.).

Of note, each client may not necessarily interact with the database cluster in the same fashion. For example, client 1 108a may interact with database cluster 104 in order to write data to or otherwise manipulate data within the database cluster while client 2 108b may interact with database cluster 104 in order to retrieve data from the database cluster. As such, information regarding database node status may not be the same for all clients. Rather, as disclosed in greater detail elsewhere herein, current information regarding database node status may be provided to each client when each client attempts to connect with and otherwise interact with the database cluster.

Figure 1B:
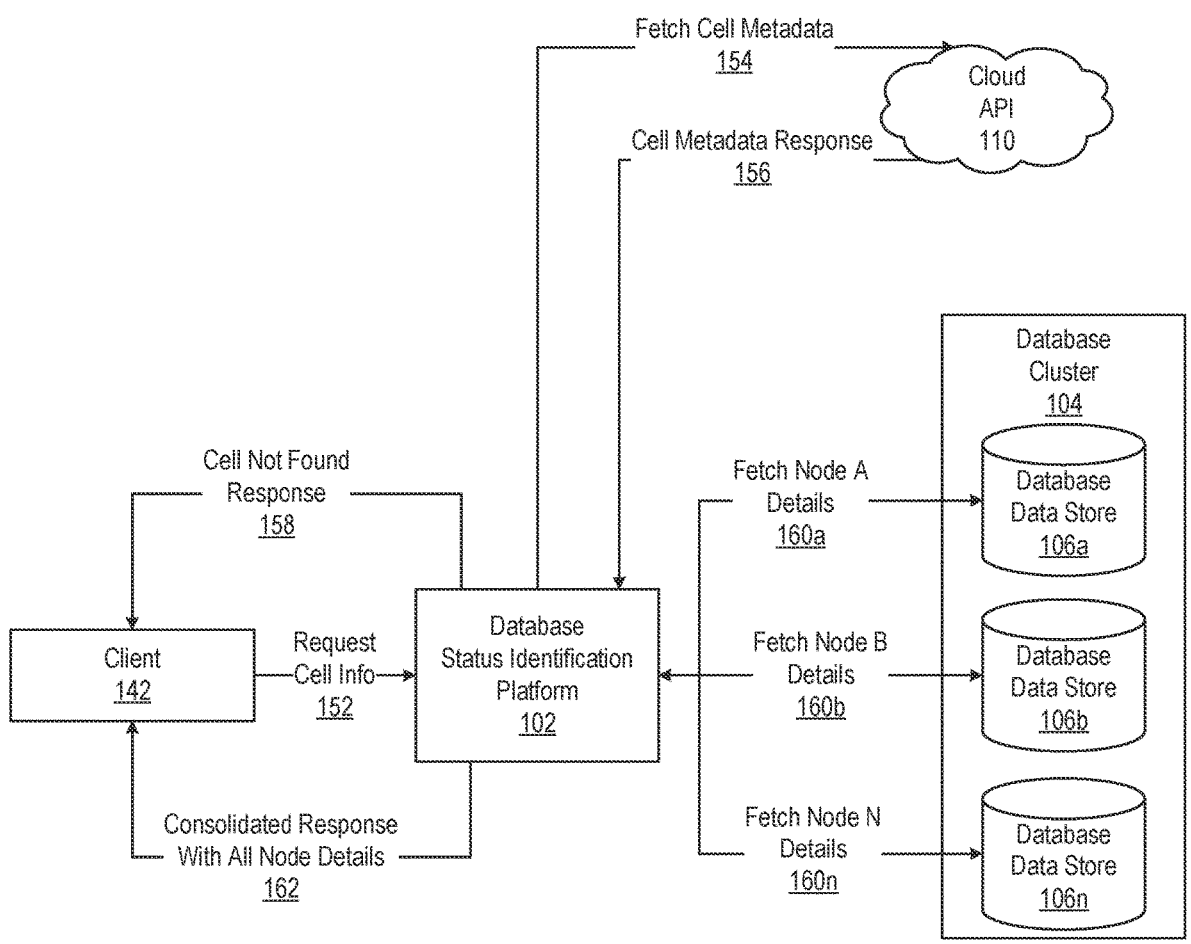
FIG. 1B is a block diagram illustrating flows in a system for dynamically finding database nodes and replication state according to some example implementations.

FIG. 1B illustrates various flows within a system 140 within which dynamically finding data nodes and replication state within a database cluster deployed within a cloud environment may be utilized. Generally, system 140 is similar to system 100 of FIG. 1A and like elements may be identified with the same reference numerals. In various implementations, client 142 may submit a request cell info 152 to database status identification platform 102. Request cell info 152 may include, for example, a unique identifier of database cluster 104. Based on the unique identifier, database status identification platform 102 may submit a fetch cell metadata 154 to cloud API 110 and receive a cell metadata response 156 from cloud API 110. Cell metadata response 156 may include, for example, information about database cluster 104 such as, a number of database nodes within the database cluster, network address and port number for each database node, or the like. In the case that the client requests information about a database cluster that does not exist or otherwise may not be found, database status identification platform 102 may notify client 142 via cell not found response 158.

Database status identification platform 102 may determine a status for each of the database nodes within database cluster 104 by establishing a connection with each node and retrieving the status via the connection. For example, database status identification platform 102 may establish a connection with database data store 106a and retrieve the status of this node via fetch node A details 160a. Similarly, database status identification platform 102 may retrieve the status of database data store 106b via fetch node B details 160b and may retrieve the status of database data store 106n via fetch node N details 160n. In some implementations, each connection may be, for example, a Java database connectivity (JDBC) connection. In some implementations, the various connections may be established, for example, in parallel such that database status identification platform 102 receives all of the statuses at nearly the same time.

Database status identification platform 102 may provide, for example, the metadata received from cloud API 110 and the various database node status to client 142 via consolidated response with all node details 162. In this way, client 142 is informed of the various database nodes within database cluster 104 as well as a corresponding status for each node. Based on this information, client 142 may then establish a connection with the appropriate database node within the database cluster and perform any necessary functions.

Figure 2A:
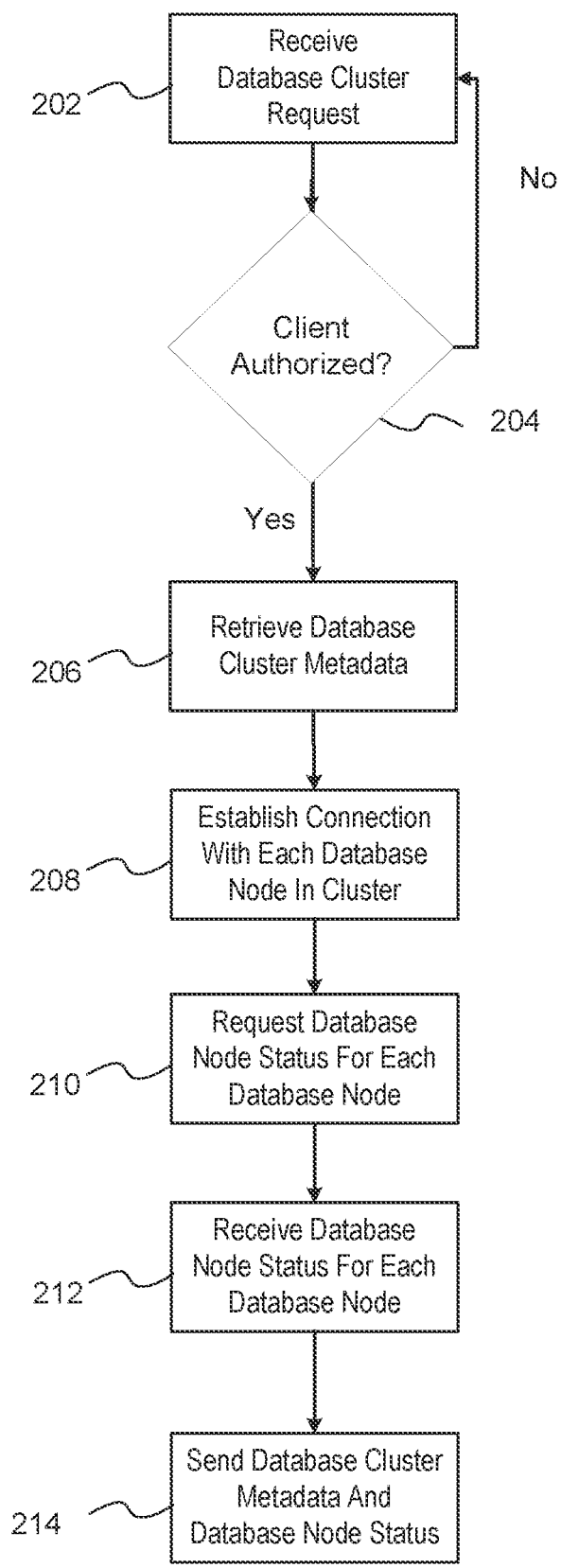
FIG. 2A is a flow diagram illustrating a method for dynamically finding database nodes and replication state according to some example implementations.

FIG. 2A illustrates a method 200 for use in dynamically finding data nodes and replication state within a database cluster deployed within a cloud environment, as disclosed herein. The method may be performed, for example, by a computing platform, such as database status identification platform 102 of FIG. 1A. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a database cluster request may be received. In various implementations, the database cluster request may include, for example, a unique identifier of a database cluster, such as database cluster 104 of FIG. 1A. In some implementations, the database cluster request may be received by a platform, such as database status identification platform 102 of FIG. 1A. In some implementations, the database cluster request may be received from a client, such as any one of client 1 . . . n 108a . . . n of FIG. 1A.

In determination step 204, whether the client is authorized may be determined. For example, the client may be authenticated and validated to determine whether the client is authorized to access the database cluster.

If the client is not authorized (i.e., determination step 204="No"), the method may return to step 202 in which an additional database cluster request may be received.

If the client is authorized (i.e., determination step 204="Yes"), database cluster metadata may be retrieved in step 206. In various implementations, the database cluster metadata may be retrieved via an application programming interface (API) of a cloud environment in which the database cluster may be deployed, such as cloud API 110 of FIG. 1A. The database cluster metadata may include, for example, information related to the database cluster, such as a number of nodes in the cluster, a network address and port number for each database node in the cluster, a database unique name, or the like. In some implementations, the database cluster metadata may be retrieved, for example, based on the unique database cluster identifier included in the database cluster request.

In step 208, a connection may be established with each of the database nodes in the database cluster. In various implementations, each connection may be, for example, a javascript database connectivity (JDBC) connection. In some implementations, the connections may be established in parallel.

In step 210, a database node status may be requested for each database node in the database cluster. For example, database node statuses may be requested via the connections established with the database nodes.

In step 212, a database node status may be received for each database node in the database cluster. For example, database node statuses may be received via the connections established with the database nodes.

In step 214, database cluster metadata and database node status may be sent. For example, the database cluster metadata received from the cloud environment and the database node statuses received from the database nodes may be consolidated and sent to the client from which the database cluster request was received. In some implementations, the database cluster metadata and database node statuses may be consolidated into a payload file having a serialized data format or standard message interchange format, such as javascript object notation (JSON).

As can be seen, real-time or near real-time information about database nodes in a database cluster may be identified and provided to a client. This may allow the client, at runtime, to identify and connect with an appropriate database node without maintaining a registry of database nodes.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
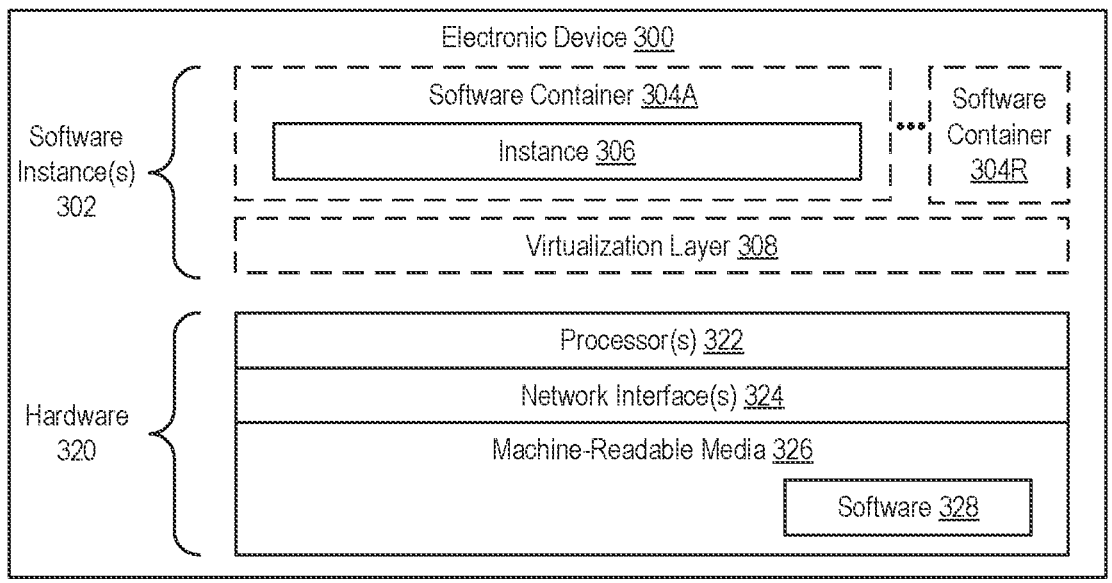
FIG. 3A is a block diagram illustrating an electronic device according to some example implementations.

FIG. 3A is a block diagram illustrating an electronic device 300 according to some example implementations.

FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and secure self-contained mechanism for managing interactions between distributed components may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
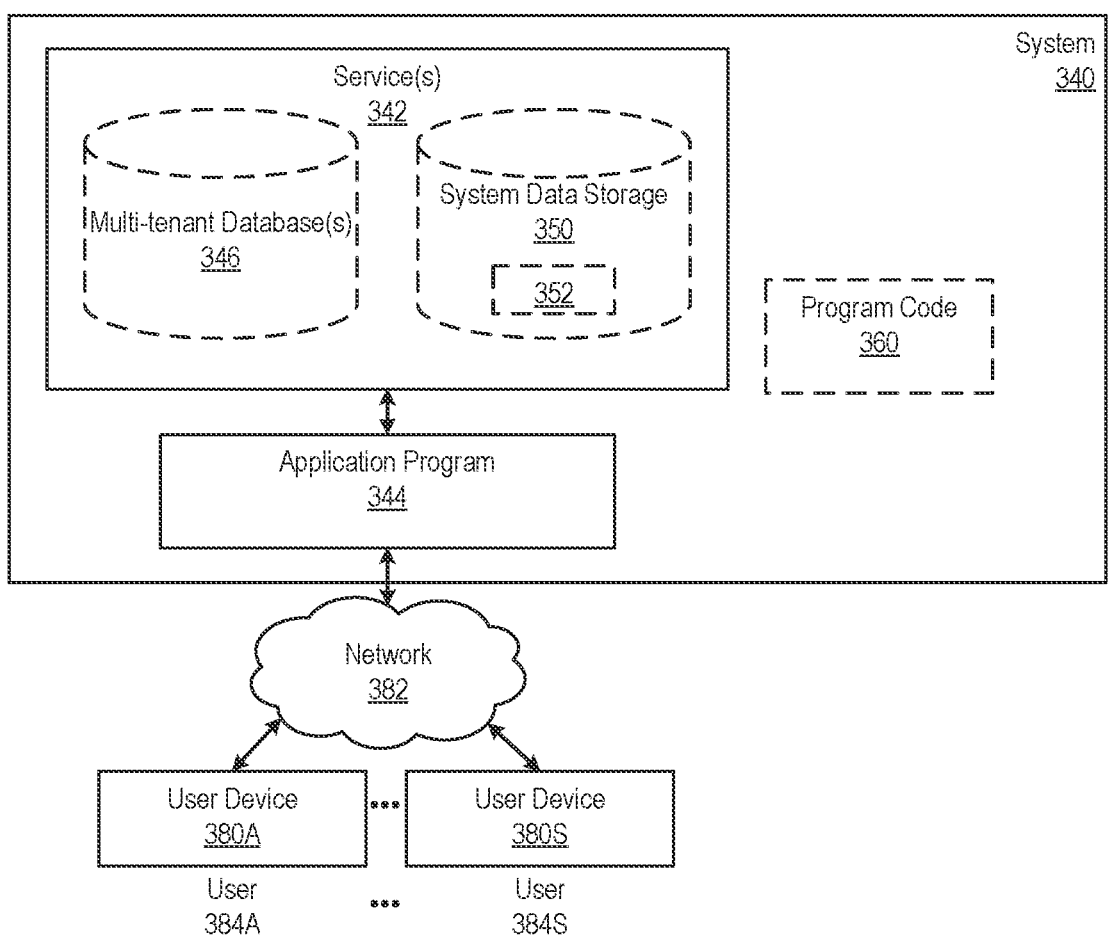
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a secure self-contained mechanism for managing interactions between distributed components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for identifying database nodes within a database cluster, the method comprising:
   receiving, by a server, a database cluster request from a client, wherein:
      the database cluster request includes an identifier for a database cluster;
      the database cluster includes a plurality of database nodes; and
      the database cluster is deployed within a cloud environment;
   retrieving, via an application programming interface of the cloud environment, a set of database cluster metadata, the set of database cluster metadata including information about the plurality of database nodes;
   for at least one of the plurality of database nodes:
      establishing, by the server, a connection with a respective database node;
      requesting, via the established connection, a status of the database node; and
      receiving, by the server and from the database node, the status of the database node;
   creating a payload file having a serialized data format;
   adding the set of database cluster metadata and the status of the database node into the payload file; and
   sending the payload file to the client.

2. The computer-implemented method of claim 1, further comprising:
   determining, by the client, a primary database node of the database cluster based on the set of database cluster metadata and the status of the database node; and establishing, by the client, a connection with the primary database node.

3. The computer-implemented method of claim 1, further comprising:
   authenticating the client; and
   validating the database cluster request.

4. The computer-implemented method of claim 1, wherein information about the plurality of database nodes comprises:
   a number of the plurality of database nodes;
   a network address and port number for each of the plurality of database nodes; and
   a database unique name.

5. The computer-implemented method of claim 1, wherein establishing a connection with the database node comprises establishing a java database connectivity (JDBC) connection with the database node.

6. The computer-implemented method of claim 1, wherein the status of the database node comprises a replication state of the database node.

7. The computer-implemented method of claim 1, wherein the serialized data format is javascript object notation (JSON).

8. A non-transitory machine-readable storage medium that provides instructions that, if executed by a processor, are configurable to cause the processor to perform operations comprising:
   receiving, by a server, a database cluster request from a client, wherein:
      the database cluster request includes an identifier for a database cluster;
      the database cluster includes a plurality of database nodes; and
      the database cluster is deployed within a cloud environment;
   retrieving, via an application programming interface of the cloud environment, a set of database cluster metadata, the set of database cluster metadata including information about the plurality of database nodes;
   for at least one of the plurality of database nodes:
      establishing, by the server, a connection with a respective database node;
      requesting, via the established connection, a status of the database node; and
      receiving, by the server and from the database node, the status of the database node;
   creating a payload file having a serialized data format;
   adding the set of database cluster metadata and the status of the database node into the payload file; and
   sending the payload file to the client.

9. The non-transitory machine-readable storage medium of claim 8, wherein the instructions are further configurable to cause the processor to perform further operations comprising:
   determining, by the client, a primary database node of the database cluster based on the set of database cluster metadata and the status of the database node; and
   establishing, by the client, a connection with the primary database node.

10. The non-transitory machine-readable storage medium of claim 8, wherein the instructions are further configurable to cause the processor to perform further operations comprising:
   authenticating the client; and
   validating the database cluster request.

11. The non-transitory machine-readable storage medium of claim 8, wherein information about the plurality of database nodes comprises:
   a number of the plurality of database nodes;
   a network address and port number for each of the plurality of database nodes; and
   a database unique name.

12. The non-transitory machine-readable storage medium of claim 8, wherein establishing a connection with the database node comprises establishing a java database connectivity (JDBC) connection with the database node.

13. The non-transitory machine-readable storage medium of claim 8, wherein
   the serialized data format is JSON.

14. An apparatus comprising:
   a processor; and
   a non-transitory machine-readable storage medium that provides instructions that, if executed by the processor, are configurable to cause the apparatus to perform operations comprising:
      receiving, by a server, a database cluster request from a client, wherein:
         the database cluster request includes an identifier for a database cluster;
         the database cluster includes a plurality of database nodes; and
         the database cluster is deployed within a cloud environment;
      retrieving, via an application programming interface of the cloud environment, a set of database cluster metadata, the set of database cluster metadata including information about the plurality of database nodes;
      for at least one of the plurality of database nodes:
         establishing, by the server, a connection with a respective database node;
         requesting, via the established connection, a status of the database node; and
         receiving, by the server and from the database node, the status of the database node;
      creating a payload file having a serialized data format;
      adding the set of database cluster metadata and the status of the database node into the payload file; and
      sending the payload file to the client.

15. The apparatus of claim 14, wherein the instructions are further configurable to cause the processor to perform further operations comprising:
   determining, by the client, a primary database node of the database cluster based on the set of database cluster metadata and the status of the database node; and
   establishing, by the client, a connection with the primary database node.

16. The apparatus of claim 14, wherein the instructions are further configurable to cause the processor to perform further operations comprising:
   authenticating the client; and
   validating the database cluster request.

17. The apparatus of claim 14, wherein information about the plurality of database nodes comprises:
   a number of the plurality of database nodes;
   a network address and port number for each of the plurality of database nodes; and
   a database unique name.

18. The apparatus of claim 14, wherein the status of the database node comprises a replication state of the database node.

19. The apparatus of claim 14, wherein the serialized data format is JSON.

* * * * *